(12) United States Patent
Starr et al.

(10) Patent No.: US 7,189,945 B2
(45) Date of Patent: Mar. 13, 2007

(54) ENCLOSED TOASTER

(75) Inventors: William D. Starr, Richmond, VA (US); Nhiem V. Nguyen, Glen Allen, VA (US); Terry L. Myers, Richmond, VA (US); Paul M. Blankenship, Glen Allen, VA (US); Adam D. Steinman, Richmond, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 11/057,501

(22) Filed: Feb. 14, 2005

(65) Prior Publication Data

US 2005/0178757 A1  Aug. 18, 2005

Related U.S. Application Data

(60) Provisional application No. 60/544,971, filed on Feb. 12, 2004.

(51) Int. Cl.
    *A47J 37/08* (2006.01)
(52) U.S. Cl. .............. 219/392; 219/386; 219/408; 99/327; 99/335; 99/391
(58) Field of Classification Search ............. None
    See application file for complete search history.

(56) References Cited

U.S. PATENT DOCUMENTS

| | | | | |
|---|---|---|---|---|
| 1,624,893 A | * | 4/1927 | Marsden | 99/338 |
| 1,820,885 A | * | 8/1931 | Le Vine | 99/392 |
| 2,239,862 A | | 4/1941 | Scalph et al. | |
| 2,497,205 A | | 2/1950 | Brewton | |
| 3,416,430 A | | 12/1968 | Hauser | |
| 3,660,637 A | * | 5/1972 | Grove | 219/413 |
| 4,487,115 A | * | 12/1984 | Su | 99/327 |
| 6,539,840 B2 | * | 4/2003 | Choi et al. | 99/331 |
| 6,772,678 B2 | * | 8/2004 | Choi et al. | 99/331 |
| 6,841,765 B2 | | 1/2005 | Back et al. | |
| 6,864,470 B2 | * | 3/2005 | Back | 219/685 |
| 6,867,398 B2 | * | 3/2005 | Lee | 219/680 |
| 6,921,887 B2 | * | 7/2005 | Back et al. | 219/680 |

OTHER PUBLICATIONS

"White Kenmore 1.2 cu. ft. Toast N Wave Microwave Oven at sears.com"; http://www.sears.com/sr/javasr/product.do?BV_SessionID=@@@@1364972181.1106584; Jan. 24, 2005 printout, 1 page.

"1920-1940"; http://www.toaster.org/1920.html; May 2, 2005 printout, 5 pages.

* cited by examiner

*Primary Examiner*—Joseph Pelham
(74) *Attorney, Agent, or Firm*—Akin Gump Strauss Hauer & Feld, LLP

(57) ABSTRACT

A toaster for heating foodstuffs includes a chassis having a cavity therein and having at least one chassis opening for accessing the cavity. A door is movable with respect to the chassis between a closed position in which the door substantially covers the chassis opening, and an open position in which the cavity is accessible through the chassis opening. A carriage with at least one slot is movable between a first position disposed completely within the cavity and a second position extending at least partially from the cavity through the chassis opening. The toaster has a heating configuration in which the carriage is in the first position and the door is in the closed position to confine the foodstuff being heated and create a generally enclosed chamber within the cavity in which heat and moisture loss is controlled.

9 Claims, 4 Drawing Sheets

US 7,189,945 B2

ENCLOSED TOASTER

CROSS-REFERENCE TO RELATED APPLICATIONS

This patent application claims priority to U.S. Provisional Patent Application No. 60/544,971, filed Feb. 12, 2004, entitled "Enclosed Toaster", the disclosure of which is incorporated herein by reference.

BACKGROUND OF THE INVENTION

This invention generally relates to toasters, and, more particularly to toasters that totally enclose foodstuff being toasted.

Toasters are generally well-known. Many toasters of various configurations have been developed, including open-slot toasters and toaster ovens. However, the toasters developed to date are not generally draft-tight. In fact, many toasters have slots therein for the insertion and removal of foodstuffs to be toasted that remain open to the outside throughout the toasting process. This most notably leads to increased toasting time of foodstuffs. Additionally, toasted foodstuffs cool relatively quickly after the toasting cycle of the existing toasters ends. Therefore, if a user wishes to have warm toasted foodstuffs, the user must remove the foodstuffs shortly after the toasting cycle ends.

It would be desirable to have a toaster with an enclosed toasting and holding chamber in which heat and moisture loss can be controlled in order to overcome the above-stated problems. The toaster of the present invention seeks to remedy the shortcomings of the toasters presently available on the market.

BRIEF SUMMARY OF THE INVENTION

Briefly stated, the present invention is a toaster for heating foodstuffs. The toaster comprises a chassis defining a cavity within an interior thereof. The chassis has at least one chassis opening to allow access to the cavity from outside of the chassis. A door is movable with respect to the chassis. The door has at least an open position and a closed position, such that, when in the closed position, the door substantially covers the chassis opening, and, when in the open position, the cavity is accessible through the chassis opening. A carriage is slidable in a generally horizontal direction with respect to the chassis. The carriage has a first position disposed completely within the cavity and a second position extending at least partially out of the cavity through the chassis opening. At least one slot is on the carriage. The slot is of a sufficient size and shape to accommodate a foodstuff to be heated. At least one heating element is engaged with the chassis and positioned within the cavity to be proximate the at least one slot when the carriage is in the first position. The toaster has a heating configuration in which the carriage is in the first position and the door is in the closed position to confine the foodstuff being heated and create a generally enclosed chamber within the cavity in which heat and moisture loss is controlled.

In another aspect, the present invention is a toaster for heating foodstuffs. The toaster comprises a chassis defining a cavity within an interior thereof. The chassis has at least one chassis opening extending between a front and a top of the chassis to allow access to the cavity from outside of the chassis. A door is pivotably engaged with the chassis. The door is generally L-shaped in cross-section and has at least an open position and a closed position, such that, when in the closed position, the door substantially covers the chassis opening, and, when in the open position, the cavity is accessible through the chassis opening. A carriage is fixedly engaged with the door. The carriage has a first position disposed completely within the cavity when the door is in the closed position and a second position extending at least partially from the cavity through the chassis opening when the door is in the open position. At least one slot is disposed on the carriage. The slot is of a sufficient size and shape to accommodate a foodstuff to be heated. When the door is in the open position, the at least one slot is at least partially exposed, thereby allowing foodstuff to be loaded into the at least one slot. At least one heating element is engaged with the chassis and positioned within the cavity to be proximate the at least one slot when the carriage is in the first position. The toaster has a heating configuration in which the carriage is in the first position and the door is in the closed position to confine the foodstuff being heated and create a generally enclosed chamber within the cavity in which heat and moisture loss is controlled.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
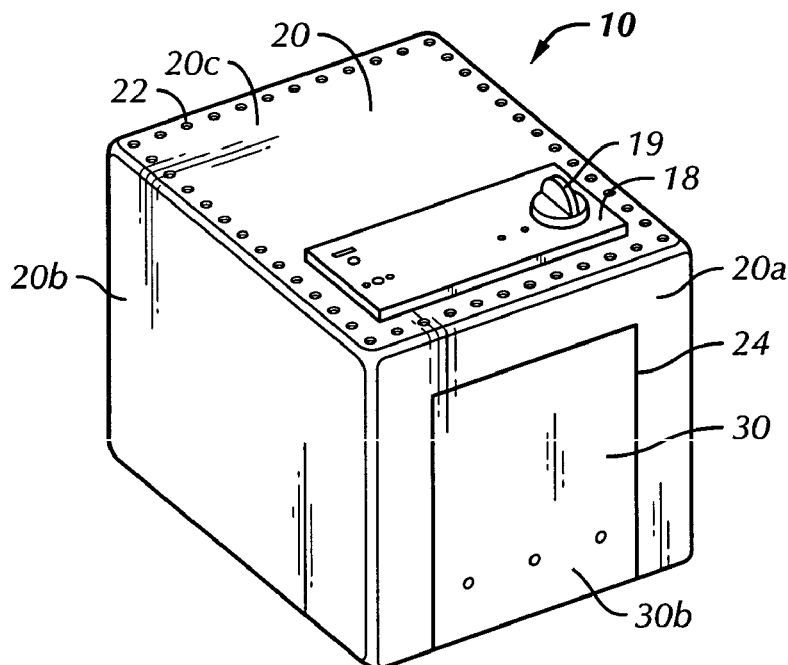
FIG. 1 is a top left perspective view of a toaster in accordance with a first preferred embodiment of the present invention, the toaster being in a closed, toasting configuration.

Certain terminology is used in the following description for convenience only and is not limiting. The words "right", "left", "upper", and "lower" designate directions in the drawings to which reference is made. The terminology includes the words above specifically mentioned, derivatives thereof, and words of similar import.

Figure 2:
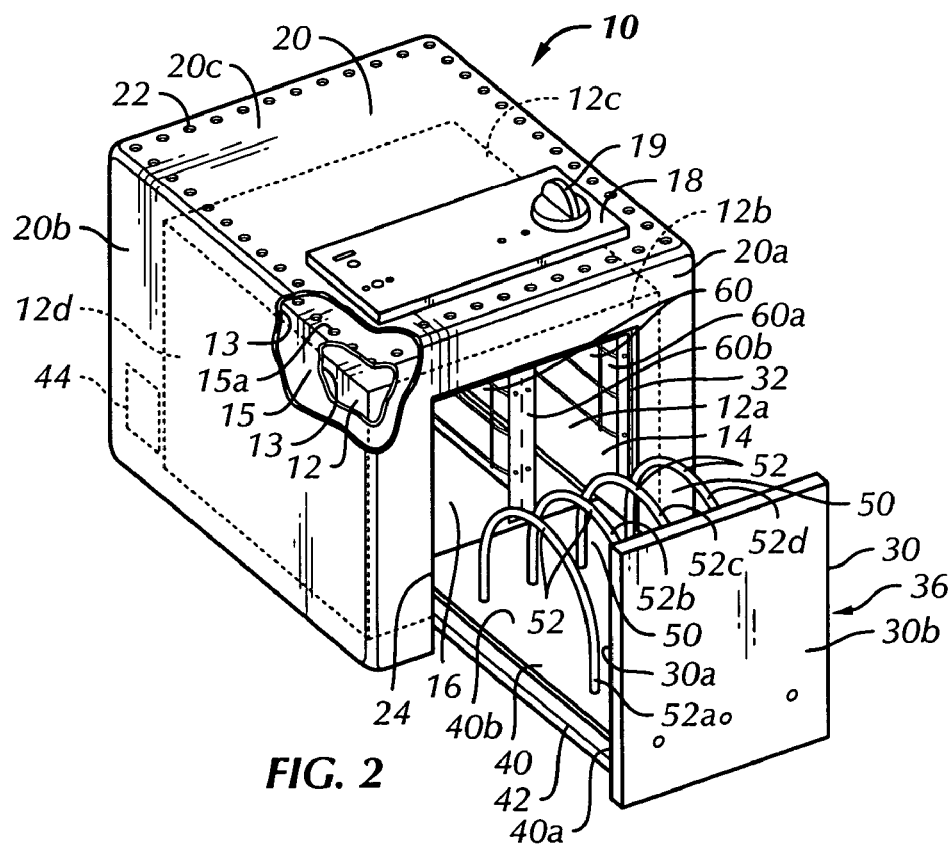
FIG. 2 is a top left perspective view of the toaster of FIG. 1 in an open, toast-loading configuration.

Referring to the drawings in detail, wherein like numerals indicate like elements throughout, there is shown in FIGS. 1–2 a first preferred embodiment of a toaster, indicated generally at 10, in accordance with the present invention. The toaster 10 is intended for the toasting and/or heating (hereinafter referred to as "toasting") of foodstuffs (not shown) placed therein. Referring to FIGS. 1 and 2, the first embodiment of the toaster 10 has a housing 20 having a front 20a, a back (not shown), a left side 20b, a right side (not shown), a top 20c, and a bottom (not shown). Although the housing 20 is generally in the form of a parallelepiped, this shape is not intended to be limiting, with other shapes, such as rounded, for instance, being within the spirit and scope of the present invention. Preferably, a housing opening 24 is disposed within the front 20a of the housing 20. Preferably, the housing 20 is made of metal, although it is within the spirit and scope of the present invention that the housing 20 be made of a ceramic material; a polymeric material, such as, but not limited to, a thermoplastic material or a thermoset plastic material that does not soften when heated; or some other suitable material.

The housing 20 preferably surrounds a metal chassis 12 defining a cavity 12a within an interior of the chassis 12. The chassis 12 is preferably in the form of a rectangular box having a front side 12b, a top side 12c, a left side 12d, a right side (not shown), a back side (not shown), and a bottom (not shown). Preferably, the front 12b of the chassis 12 has at least one chassis opening 14 therein, which corresponds to the housing opening 24 to allow access to the cavity 12a from outside of the chassis 12, thereby enabling a user to insert foodstuff within the toaster 10. Although this configuration is preferable, it is within the spirit and scope of the present invention that the chassis opening 14 can be within any of the sides or combinations of sides of the chassis 12. Except for the chassis opening 14, the sides of the chassis 12 are preferably rectangular sheets of metal joined together at their edges to form a solid metal enclosed box.

Preferably, the housing 20 is spaced from the chassis 12 to create a gap 13 therebetween. Preferably contained within a portion of this gap 13 are control electronics (not shown) for electronically controlling operation of the toaster 10. The chassis 12 preferably has feet or stand-offs (not shown) made of a heat resistant, insulating material extending from the bottom thereof to provide engagement of the chassis 12 to the housing 20. By providing the gap 13 between the housing 20 and the chassis 12, the housing 20 can be at least partially insulated from heat radiating from the chassis 12 during toasting in order to maintain the exterior of the housing 20 at a temperature that is relatively cooler than the temperature of the chassis 12 inside of the housing 20 while foodstuff is being toasted or heated (hereinafter referred to as "toasted") within the toaster 10. To further aid in maintaining the housing 20 at the relatively cooler temperature, intake and/or exhaust vents 22 are disposed through the housing 20, preferably in the top 20c and bottom thereof, to facilitate the dissipation of heat, which tends to build up within the gap 13 during use. That is, radiant heat from the chassis 12 during toasting is able to escape from within the gap 13 through at least some of the vents 22 (the exhaust vents 22 in the top 20c of the housing 20), while cooler ambient air from outside of the toaster 10 is able to enter the gap 13 through some of the vents 22 (the intake vents (not shown) in the bottom of the housing 20).

It is also contemplated that there be at least one layer, and preferably a plurality of layers, of enclosure material (not shown) and/or insulation (not shown) around the chassis 12 between the housing 20 and the chassis 12 in order to aid in keeping the housing 20 relatively cool. The insulation layers can comprise various insulators, such as, but not limited to, fiberglass, ceramic glass, and/or air. The layers of enclosure material and/or insulation can have intake and exhaust vents (not shown) therein to help manage heat within the gap 13. The layers of enclosure material and/or insulation further aid in maintaining the control electronics within a safe temperature range in order to decrease the likelihood of damage to the control electronics due to excessive heat.

It is further contemplated that there be an additional preferably metallic middle layer 15 (FIG. 2) at least partially surrounding the chassis 12, such that the middle layer 15 is disposed between the chassis 12 and the housing 20. That is, the toaster 10 has a triple-layer construction with the chassis 12 making up an innermost layer, the middle layer 15 making up an intermediate layer, and the housing 20 making up an outermost layer. The middle layer 15 is spaced from both the housing 20 and the chassis 12 to create gaps therebetween. As with the gap 13 described above, the gaps aid in insulating the housing 20 and the middle layer 15 from the heat radiating from the chassis 12 during operation of the toaster 10. Insulation and/or enclosure material is preferably disposed within the gaps and intake and/or exhaust vents 15a are disposed through the middle layer 15, generally corresponding to the intake and/or exhaust vents 22 through the housing 20, to aid in heat management within the toaster 10. With this triple-layer configuration, the stand-offs of the chassis 12 are mounted to a bottom of the middle layer 15, and similar stand-offs extending from the bottom of the middle layer 15 are mounted to the bottom of the housing 20. By constructing the toaster 10 with the middle layer 15, it is believed that the housing 20 can be maintained at a lower temperature during operation of the toaster 10 than the previously-described double-layer toaster 10, if necessary.

Located on one of the front 20a, top 20c, or sides of the housing 20, there is a control panel 18 having at least one knob 19 for setting the length of toasting time and a toast initiation lever or button (not shown). The control panel 18 can also have various buttons (not shown) including a button to cancel toasting, a button for toasting bagels, a defrost button, and a button for reheating food, to name a few. The activation of each button triggers a particular action of the toaster 10 having a specific toasting time and toasting intensity, as is well understood by those of ordinary skill in the art. It is alternately contemplated that the control panel 18 include a dial (not shown) to scroll through a list of settings displayed on a liquid crystal display (LCD) (not shown) or a light emitting diode (LED) screen (not shown) to select optimum toasting or reheating conditions for various types of foodstuffs.

A door 30 is operatively engaged with and movable with respect to the chassis 12. The door 30 has at least an open position (FIG. 2) and a closed position (FIG. 1), such that, when in the closed position, the door 30 substantially covers the chassis opening 14, and, when in the open position, the cavity 12a is accessible through the chassis opening 14.

A carriage 40 is movably engaged with the chassis 12 within the cavity 12a. Preferably, the carriage 40 is slidable in a generally horizontal direction with respect to the chassis 12, so that, in a first position, the carriage 40 is disposed completely within the cavity 12a and, in a second position, the carriage 40 extends at least partially from the cavity 12a through the chassis opening 14. At least one heating or toasting slot 50 is disposed on the carriage 40, preferably extending from a top 40b of the carriage 40, such that the toasting slot 50 is oriented in a generally vertical direction. Preferably, there are two toasting slots 50 disposed side-by-side on the carriage 40, although it is within the spirit and scope of the present invention that there be more or less than two toasting slots 50. The toasting slots 50 are of a sufficient size and shape to accommodate foodstuffs to be toasted, such as, but not limited to, slices of bread, bagels, and muffins.

The toasting slots 50 preferably include generally parallel, spaced apart holding members 52 extending outwardly from the top 40b of the carriage 40 so that the toasting slots 50 are oriented in a generally vertical direction. Preferably, for the two-slot toaster 10 described herein, there are four holding members 52a, 52b, 52c, 52d to define the two toasting slots 50, one between the holding members 52a, 52b and another between the holding members 52c, 52d. Although depicted in FIG. 2 as being generally semicircular tubular wire members, it is within the spirit and scope of the present invention that the holding members 52 be of any shape or configuration, additional potential configurations being vented metal walls, horizontal or vertical tubular wire members, and a crossed pattern of intersecting tubular members. Additionally, the holding members 52 can be wire support members that are spring-loaded to move toward one another in order to confine and generally center foodstuffs within the toasting slots 50 (see FIGS. 6 and 7). Also, it is further within the spirit and scope of the present invention that there be more or less than four holding members 52 (as shown in FIG. 2) depending on the size of the toaster 10 and/or the intended capacity of the toaster 10.

Preferably, the door 30 of the first embodiment toaster 10 is fixedly engaged to a front end 40*a* of a carriage 40, such that the carriage 40 and the door 30 form a drawer 36 which can be opened in order to at least partially expose the toasting slots 50 in order to allow foodstuffs to be loaded therein. In this way, the toaster 10 is placed in an open, toast-loading configuration (FIG. 2).

The drawer 36 can either be manually operated (i.e., the user pulls it open and pushes it closed) or motorized for mechanized opening and closing. Preferably, the motorized drawer 14 is driven by an electric motor 44 (shown in phantom in FIG. 2) and opens upon a cue by the user, such as the pushing of a button (not shown), although it is within the spirit and scope of the present invention that the toaster 10 have a thermal sensor (not shown) to allow for the drawer 36 to automatically open at the termination of the toast cycle. If used in conjunction with the thermal sensor, the motorized drawer 36 would only be allowed to open if an internal temperature of the toaster 10 is below a specified level. The manually opening drawer 36 can include an optional latch (not shown) that operates to physically latch the drawer 36 closed. It is within the spirit and scope of the present invention that the latch be either separate from or part of the toast initiation lever.

Preferably, a plurality of heating elements 60 are engaged with the chassis 12 and disposed within the cavity 12*a*. The heating elements 60 radiate heat when powered. The construction and operation of the heating elements 60 are similar to those typically found in conventional open-slot toasters and are well-known in the industry. The heating elements 60 can be encased in a material such as mica, for instance, to reduce the likelihood of damage due to mechanical intervention of foodstuffs that are stuck or jammed within the cavity 12*a*.

The heating elements 60 are preferably positioned within the cavity 12*a* to be proximate the toasting slots 50 when the carriage 40 is in the first position. The heating elements 60 preferably include two side heating elements 60*a*, which are engaged with left and right sides of the chassis 12 within the cavity 12*a*, parallel to the left and right sides of the chassis 12. Preferably, the side heating elements 60*a* are face wound to radiate heat from only an inwardly-facing side of the side heating element 60*a*. Additionally, the heating elements 60 include at least one pendant center heating element 60*b* extending inwardly from the chassis 12 within the cavity 12*a*, parallel to the side heating elements 60*a* and equally spaced therebetween. The center heating element 60*b* is engaged with the chassis 12 along a top side (not shown) and a back side (not shown) of the cavity 12*a*, leaving a bottom side of the center heating element 60 unattached and spaced from a bottom side of the cavity 12*a* to allow for the drawer 36 to slide freely below the center heating element 60*b*. The center heating element 60*b* can either be a single heating element wound on both sides to radiate heat from both sides thereof or two face wound heating elements (similar to the side heating elements 60*a* discussed above) placed side-by-side to radiate heat toward the sides of the cavity 12*a*.

The heating elements 60 are powered to toast the foodstuffs placed in the toasting slots 50 between the holding members 52*a*, 52*b*, 52*c*, 52*d*. Preferably, the two side heating elements 60*a* are located outwardly from the toasting slots 50 and the pendant center heating element 60*b* is located between the toasting slots 50 (i.e., between holding members 52*b*, 52*c* of FIG. 2) when the carriage 40 is in the first position. This configuration allows for each side of the foodstuffs placed within the toasting slots 50 to be toasted. Although this configuration is preferred, it is not intended to be limiting, as there can be any number of heating elements 60 located within the housing 20.

Referring specifically to FIG. 1, the toaster 10 is shown in a closed, toasting configuration. When in the closed, toasting configuration, the drawer 14 is closed. That is, the carriage 40 is in the first position and the door 30 is in the closed position. When closed, a flat interior surface 30*a* of the door 30 is brought into contact with a mating flat surface of the chassis 12 around the chassis opening 14, partially overlapping it to totally close the chassis opening 14 and restrict air draft flow. In this way, a generally enclosed toasting chamber 16 is formed within the cavity 12*a* to confine foodstuffs being toasted and allow for control of heat and moisture loss from within the toasting compartment 16. Also, a separate seal 32 may be included on either the flat interior surface 30*a* of the door 30 or around the chassis opening 14 to further assist in blocking drafts, thereby further controlling heat and moisture loss from within the toasting chamber 16. Preferably, the seal 32 is a molded silicone gasket disposed on the chassis 12 around the chassis opening 14, although it is within the spirit and scope of the present invention that the seal 32 be made of a different material provided the seal 32 is capable of functioning as described above. Additionally, it is preferable that, when the drawer 36 is closed, a front face 30*b* of the door 30 is flush with the front 20*a* of the housing 20, thereby creating a generally flat appearance to the front of the toaster 10.

Referring now to FIG. 2, the toaster 10 can be seen in the open, toast-loading configuration, in which the drawer 36 is extended outward from the front of the housing 20. Preferably, the drawer 36 has at least one rider 42 attached to the carriage 40, which slides within at least one corresponding horizontally situated track (not shown) in the chassis 20.

Preferably, the drawer 36 is removable from the housing 20 for cleaning, either in a dishwasher or by hand. No removal of a crumb tray is required because the carriage 40 is intended to act as an integral crumb tray. The carriage 40 may also have integral feet (not shown) extending from a bottom of the carriage 40 to enable it to rest on a table as a serving vessel.

Figure 3:
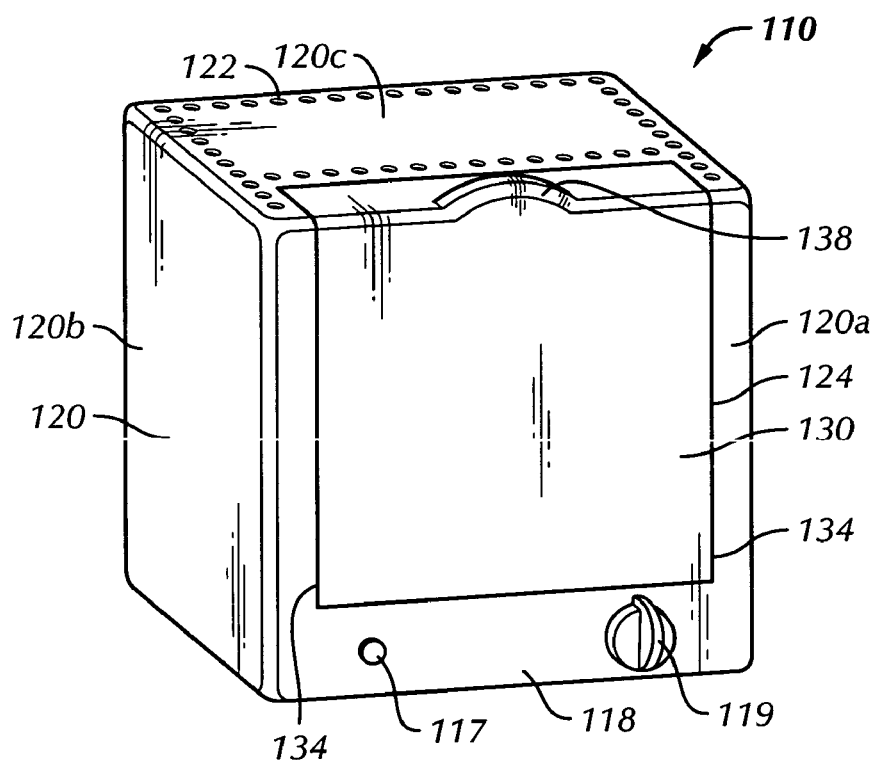
FIG. 3 is a top left perspective view of a toaster in accordance with a second preferred embodiment of the present invention, the toaster being in a closed, toasting configuration.
Figure 4:
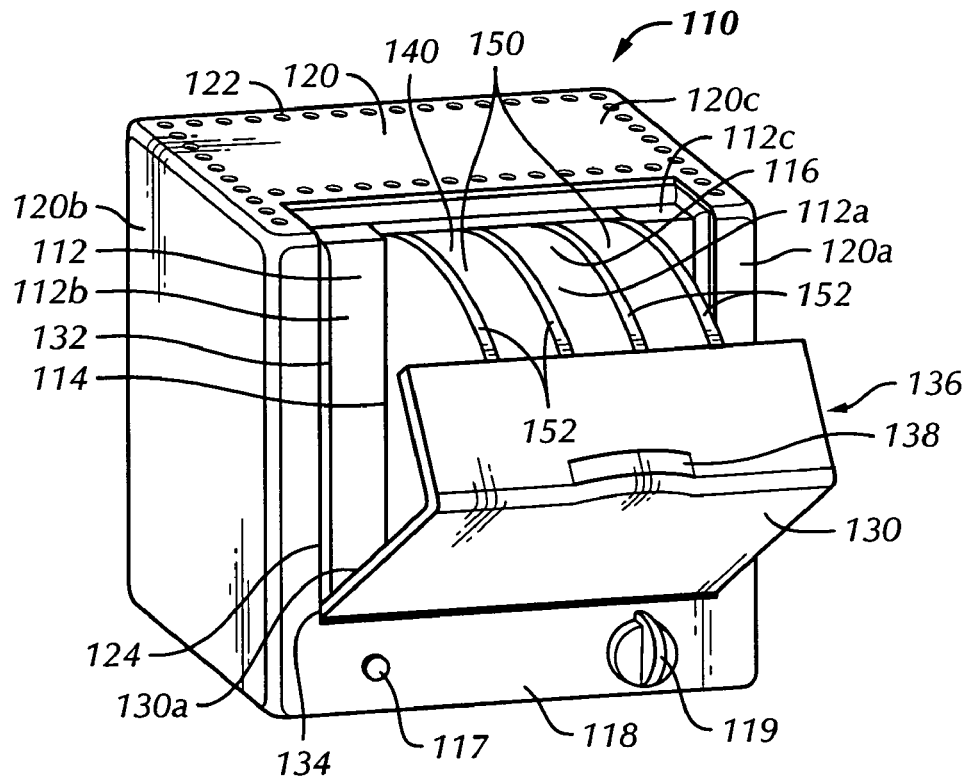
FIG. 4 is a top left perspective view of the toaster of FIG. 3 in an open, toast-loading configuration.

Referring to FIGS. 3 and 4, a toaster 110, corresponding to a second preferred embodiment of the present invention, is essentially similar to the toaster 10 of the first embodiment, the main difference being the loading configuration of the toaster 110, as described below. As such, similar elements of the second embodiment toaster 110 have numbering that differs by an increment of 100 from the corresponding elements of the first embodiment toaster 10. For example, a toasting chamber 116 of the second embodiment corresponds to the toasting chamber 16 of the first embodiment.

Instead of having a drawer 36, the toaster 110 has a pivot carriage 136 that pivots outwardly and downwardly from the front of a housing 120 when going from a closed, toasting configuration (FIG. 3) to an open, toast-loading configuration (FIG. 4). The pivot carriage 136 includes a door 130 with a carriage 140 fixedly engaged with an interior surface 130*a* of the door 130. The door 130 is generally L-shaped in cross-section and is pivotably engaged with the chassis 112, having a pivot 134 on either side of the door 130, proximate its bottom edge. The chassis 112 has a mating opening in the top 112d and front 112b that engages with the interior surface 130a of the door 130 to form an enclosed, generally draft-tight toasting chamber 116 when the toaster 110 is in the closed, toasting configuration. As with the first embodiment, a separate seal 132 may be included on either the interior surface 130a of the door 130 or around the chassis opening 114 to further assist in blocking drafts, thereby further controlling heat and moisture loss from within the toasting chamber 116. As with the toaster 10 of the first embodiment, the toaster 110 has intake and/or exhaust vents 122 disposed therethrough and can have either a double-wall or a triple-wall construction in order to manage heat within the toaster 110 during operation. Preferably, the door 130 is generally flush with both a front 120a and a top 120c of the main housing 120 when the toaster 110 is in the closed, toasting configuration.

Referring now to FIG. 4, preferably, three to four holding members 152 extend between the interior surface 130a of the door 130 and a top 140b of the carriage 140 to define two toasting slots 150. Although portrayed with two toasting slots 150, it is within the spirit and scope of the present invention that there be more or less than two toasting slots 150, depending upon the desired capacity of the toaster 110. The holding members 152 are generally as pie-shaped walls in order to allow the pivotable opening of the pivot carriage 136. Although depicted as being solid panels, the holding members 152 of the toaster 110 can be of any suitable configuration, including, but not limited to the configurations described above with respect to the holding members 52 of the first embodiment.

To facilitate the opening of the pivot carriage 136 by the user, a handle 138, in the shape of a rounded protrusion, extends upwardly from the top of the door 130. The handle 138 is intended to give the user an area to grip while manually opening the toaster 110. Although a manually opening toaster 110 is portrayed, it is within the spirit and scope of the present invention that the toaster 110 have a motorized pivot carriage 136 to allow for mechanized opening and/or closing of the pivot carriage 136. Preferably, the motorized pivot carriage 136 would open upon a cue by the user, such as the pushing of a button (not shown), although it is within the spirit and scope of the present invention that the toaster 110 have a thermal sensor (not shown) to allow for the pivot carriage 136 to automatically open at the termination of the toast cycle. As with the drawer 36 of the first embodiment, the motorized pivot carriage 136 would only be allowed to open if the internal temperature of the toaster 110 is below a specified level.

It is contemplated that the pivot carriage 136 be removable from the housing 120 so that the user may clean the pivot carriage 136, either using a dishwasher or by hand. The pivot carriage 136 can have a separate removable crumb tray (not shown) that can either form a bottom of the carriage 140 or form a bottom of the cavity 112a of the chassis 112, such that the crumb tray is located underneath the pivot carriage 136 when the toaster 110 is in the closed, toasting configuration. Several methods of removal of the crumb tray are within the spirit and scope of the present invention, such as pulling the crumb tray out from the pivot carriage 136 having a track-rider mounting configuration (not shown), swinging the crumb tray down from the pivot carriage 136 using a separate pivot assembly (not shown) therefore, slipping the crumb tray out from within the cavity 112a of the chassis 112, or sliding the crumb tray out of the cavity 112a from a back of the housing 120 where the crumb tray forms at least part of the bottom of the cavity 112a.

The toaster 110 has a control panel 118 having at least a knob 119 and a button 117 for properly configuring the settings of the toaster 110 when toasting various foods. Although the control panel 118 is shown as being located on the front 120a of the housing 120, it is within the spirit and scope of the present invention that the control panel 118 be located in a different location, such as on the top 120c of the housing 120 on either side of a top of the pivot carriage 136, for instance. Additionally, as with the toaster 10 of the first embodiment, it is alternately contemplated that the control panel 118 include a dial (not shown) to scroll through a list of settings displayed on a LCD (not shown) or a LED screen (not shown) to select optimum toasting or reheating conditions for various types of foodstuffs.

A pivot carriage lock latch (not shown) can be provided to draw the pivot carriage 136 closed against the chassis 112 over the chassis opening 114 and secure the pivot carriage 136 closed. The lock latch of the motorized pivot carriage 136 would be automatic. However, for the manually-operated pivot carriage 136, the toaster 110 has a release button or lever (not shown) to release the lock latch. The release button or lever can also be used with the automatic pivot carriage 136 as a manual override to terminate the automatic functioning of the toaster 110.

Figure 5:
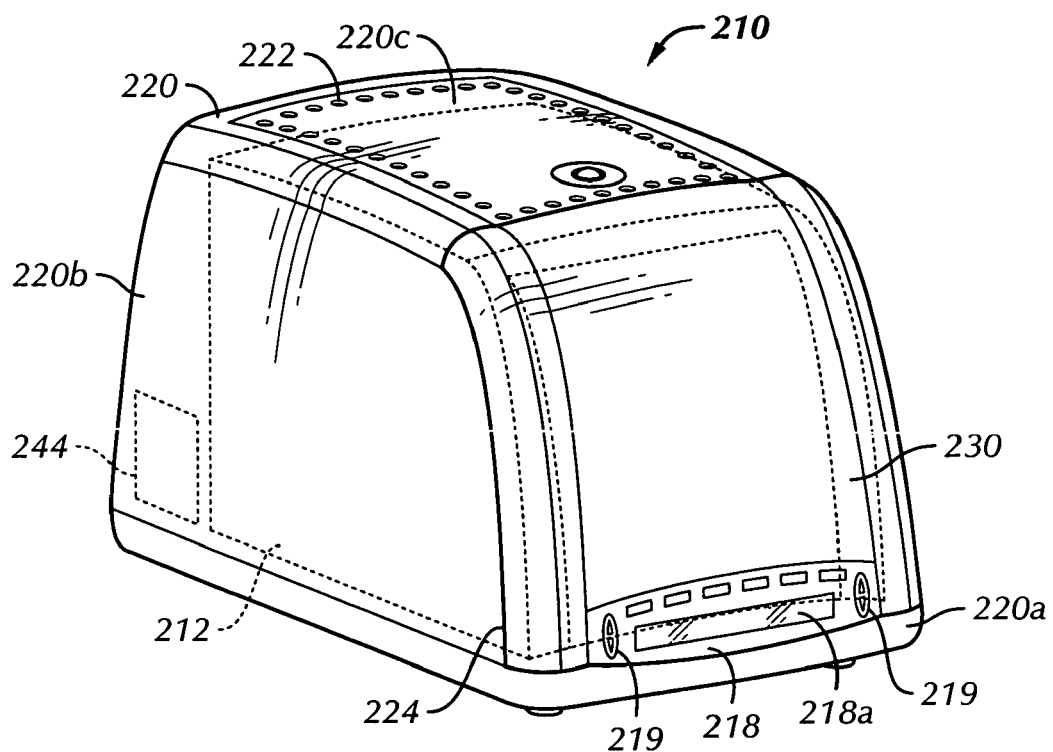
FIG. 5 is a top left perspective view of a toaster in accordance with a third preferred embodiment of the present invention, the toaster being in a closed, toasting configuration.
Figure 6:
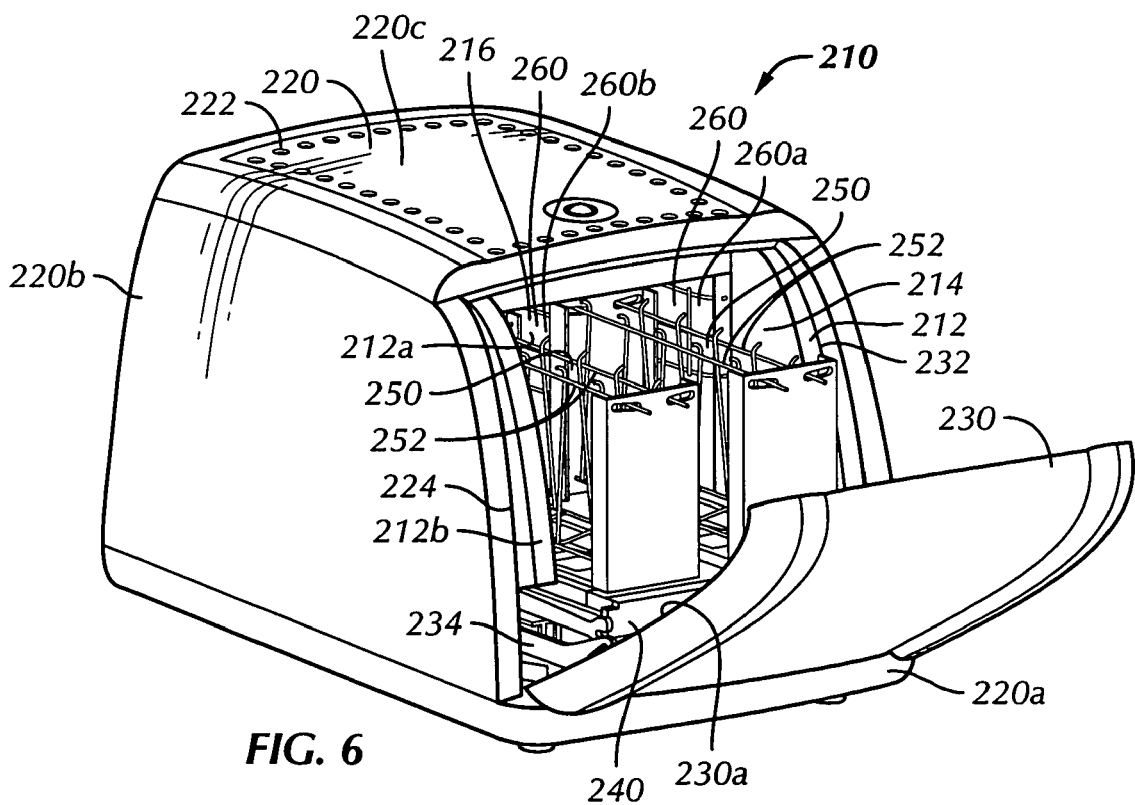
FIG. 6 is a top left perspective view of the toaster of FIG. 5 transitioning from the closed, toasting configuration to an open, toast-loading configuration.
Figure 7:
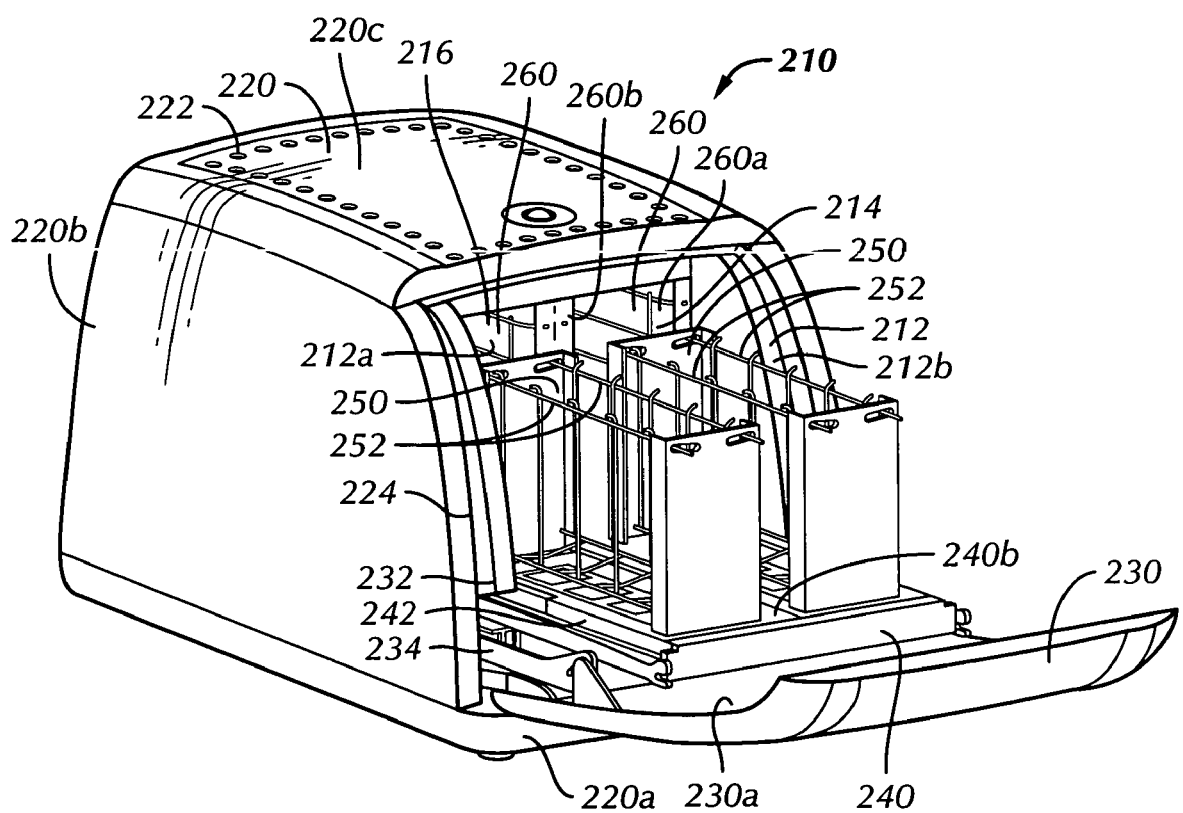
FIG. 7 is a top left perspective view of the toaster of FIG. 6 in the open, toast-loading configuration.

Referring to FIGS. 5–7, a toaster 210, corresponding to a third preferred embodiment of the present invention, is essentially similar to the toaster 10 of the first embodiment, with similar elements of the third embodiment toaster 210 having numbering that differs by an increment of 200 from the corresponding elements of the first embodiment toaster 10. For example, a toasting chamber 216 of the third embodiment corresponds to the toasting chamber 16 of the first embodiment.

The toaster 210 of the third embodiment is constructed similarly to the toaster 10 of the first embodiment described above. That is, the toaster 210 has a generally box-like, metal chassis 212 having a chassis opening 214 in a front 212b thereof and defining a cavity 212a therein. The chassis 212 is at least partially surrounded by a housing 220. The chassis 212 is preferably spaced inwardly from the housing 220, as described above with respect to the first embodiment. Preferably, feet or stand-offs (not shown) are disposed between a bottom (not shown) of the chassis 212 and a bottom (not shown) of the housing 220. Enclosure material (not shown) and/or insulation (not shown) is disposed between the housing 220 and the chassis 212 and intake and/or exhaust vents 222 are disposed in the housing 220 in order to manage heat within the toaster 210 during operation. It is further contemplated that the toaster 210 also have a middle layer (not shown) disposed between the housing 220 and the chassis 212 and at least partially surrounding the chassis 212, such that the toaster 210 has a triple-wall construction similar to that described above with respect to the first embodiment, in order to further manage heat within the toaster 210 during operation.

A door 230 is operatively engaged with and moveable with respect to the chassis 212. The door 230 has at least an open position (FIG. 7) and a closed position (FIG. 5), such that, when in the closed position, the door 230 substantially covers the chassis opening 214, and, when in the open position, the cavity 212a is accessible through the chassis opening 214. An outer surface of the door 230 preferably conforms to the shape of the housing 220 when the door 230 is in the closed position.

Referring specifically to FIGS. 6 and 7, the door 230 is preferably pivotably engaged with the chassis 212 via pivot linkages 234 disposed on either side of the door 230, proximate its bottom edge. Preferably, the pivot linkages 234 function to slide the door 230 outwardly from the housing 220 slightly in order to provide room for the door 230 to then subsequently pivot downwardly and outwardly from the housing 220. Although this is preferred, it is within the spirit and scope of the present invention that the door 230 open in a different manner, including, but not limited to, simply pivoting about an axis.

Referring again to FIGS. 5–7, a carriage 240 is moveably engaged with the chassis 212. Preferably, the carriage 240 is slidable in a generally horizontal direction with respect to the chassis 212, with the carriage 240 having a first position disposed completely within the cavity 212a and a second position extending at least partially from the cavity 212a through the chassis opening 214. Preferably, the carriage 240 has riders 242 on either side of the carriage 240 that slide within corresponding tracks (not shown) disposed within the chassis 212. Although this is preferred, it is within the spirit and scope of the present invention that any appropriate mechanism capable of imparting sliding motion to the carriage 240 be used.

Referring now to FIGS. 6 and 7, the carriage 240 preferably has two toasting slots 250 extending upwardly from a top 240b thereof, although it is within the spirit and scope of the present invention that there be more or less than two toasting slots 250, depending on the size of the toaster 210 and/or the intended capacity of the toaster 210. The toasting slots 250 are preferably vertically oriented and are defined by generally parallel, spaced holding members 252 extending upwardly from the top 240b of the carriage 240 on either side of each of the toasting slots 250. Preferably, the holding members 252 are formed by intersecting, joined vertical and horizontal wires. The holding members 252 are preferably pivotable or otherwise movable with respect to the carriage 240, so that tops of the holding members 252 of each toasting slot 250 are capable of moving toward each other in order to narrow the toasting slot 250. In this way, when foodstuffs are placed within the toasting slots 250, the holding members 252 can close slightly against the foodstuffs in order to confine and generally center the foodstuffs in the toasting slot 250. Preferably, the holding members 252 are operably engaged with the carriage 240 so that the sliding of the carriage 240 from within the cavity 212a actuates the holding members 252 from a closed position where the holding members 252 are tilted toward one another (FIG. 6) to an open position where the holding members 252 are generally vertically oriented and spaced from each other (FIG. 7). Actuation of the holding members 252 can be accomplished through conventional means that are well-known in the industry, such as torsion springs to spring-load the holding members 252 and/or pivot arm linkages, for instance. Preferably, the closed position of the holding members 252 corresponds to at least the first position of the carriage 240 so that foodstuffs are confined and centered within the toasting slots 250 during the toasting operation, and the open position of the holding members 252 corresponds to the second position of the carriage 240 to facilitate removal of foodstuffs from or insertion of foodstuffs within the toasting slots 250 when the toaster 210 is in an open, toast-loading configuration (i.e., when the door 230 is in the open position and the carriage 240 is in the second position, as shown in FIG. 7).

Still referring to FIGS. 6 and 7, heating elements 260 are disposed within the cavity 212. As described above with respect to the first embodiment, the heating elements 260 include side heating elements 260a engaged with either side of the cavity 212 and a pendant center heating element 260b engaged to a top of the cavity 212a generally at its center and extending downwardly therefrom. Each of the heating elements 260 are preferably spaced from a bottom of the cavity 212a a sufficient distance so that the sliding motion of the carriage 240 within the cavity 212a is not impeded by the heating elements 260.

Referring now to FIGS. 5–7, the toaster 210 has closed, toasting configuration (FIG. 5) in which the carriage 240 is in the first position and the door 230 is in the closed position to confine the foodstuffs being toasted and create an enclosed toasting chamber 216 within the cavity 212a in which heat and moisture loss can be controlled. That is, when in the closed position, the door 230 abuts the front 212b of the chassis 212 to essentially close the chassis opening 214, thereby reducing drafts and limiting the loss of heat and moisture from within the toasting chamber 216. It is contemplated that a separate seal 232 may be included on either an interior surface 230a of the door 230 or around the chassis opening 214 on the front 212b of the chassis 212 to better seal the toasting chamber 216 in order to assist in blocking drafts and in controlling heat and moisture loss from within the toasting chamber 216. Preferably, the seal 232 is a molded silicone gasket disposed on the chassis 212 around the chassis opening 214, although it is within the spirit and scope of the present invention that the seal 232 be made of a different material, provided the seal 232 is capable of functioning as described herein.

Referring to FIG. 5, a motor 244 (shown in phantom) preferably is operably engaged with both the door 230 and the carriage 240 to allow for mechanized opening and closing of the door 230 and mechanized sliding of the carriage 240 to enable the carriage 240 to automatically slide at least partially out of the cavity 212a when the door 230 opens and to automatically slide back into the cavity 212a when the door 230 closes. The motor 244 can be operably engaged with the door 230 and the carriage 240 using conventional means that are well-known in the industry, such as linkage arms, gears, or belts, for instance. Although it is preferred that the carriage 240 and door 230 of the toaster 210 be motorized, it is within the spirit and scope of the present invention that the carriage 240 and door 230 be manually movable by the user.

Preferably located on a front 220a of the housing 220, there is a control panel 218 having at least two buttons 219 thereon for setting the length of toasting time and a LCD or LED screen 218a for displaying the settings. Pushing of the buttons 219 allows the user to scroll through a list of settings displayed on the screen 218a to select optimum toasting or reheating conditions for various types of foodstuffs. Although it is preferred that the control panel 218 is located proximate a bottom of the front 220a of the housing 220, as shown in FIG. 5, it is within the spirit and scope of the present invention that the control panel 218 be located on a top 220c of the housing 220 or at any other point on the housing 220 that is readily accessible to and viewable by the user.

Preferably, the toasting slots 50, 150, 250 are 38 mm in width, 140 mm in length, and 140 mm in height, as defined by the configuration of the holding members 52, 152, 252. However, it is within the spirit and scope of the present invention that the dimensions of the toasting slots 50, 150, 250 be different according to the shapes and/or types of foods intended to be toasted with the toaster 10, 110, 210.

In operation, items to be toasted are placed between the holding members 52, 152, 252 of the toasting slots 50, 150, 250 of the drawer 36, pivot carriage 136, or carriage 240. The holding members 52, 152, 252 act to confine the foodstuffs within the toasting slots 50, 150, 250 as the drawer 36, pivot carriage 136, or carriage 240 is closed and during toasting of the foodstuffs. Upon closing of the drawer 36, pivot carriage 136, or carriage 240, the heating elements 60, 160, 260 are enabled. Preferably, the heating elements 60, 160, 260 are interlocked with closure of the drawer 36, pivot carriage 136, or carriage 240 so that the heating elements 60, 160, 260 can only be energized when the toaster 10, 110, 210 is in the closed, toasting configuration. The controls are set to the food type (defrost, reheat, bagel, or "other") and color choice (lightest to darkest). The food type settings differ in that the defrost setting increases the time appropriately to accommodate frozen food loads, the reheat setting reduces the time appropriately to accommodate previously-heated foods, and the bagel setting de-energizes or reduces a wattage of outboard elements (not shown) and increases the time appropriately for bagel toasting. The user then initiates the toasting cycle by pushing a start button 117, 219 or a mechanical lever (not shown), which engages a latch mechanism (not shown) to prevent the drawer 36, pivot carriage 136, or carriage 240 from being opened as a means to terminate the toasting cycle. A cancel button (not shown) can be provided for terminating a toast cycle before it would automatically end. Upon the end of the cycle, an audio signal, such as a bell or beep, is activated. After toasting is complete, the user must push another button (not shown) if the drawer 36, pivot carriage 136, or carriage 240 is motorized, or manually pull the drawer 36, pivot carriage 136, or door 230 open, if non-motorized. Additionally, the toaster 10, 110, 210 can have a thermal sensor (not shown) to detect a temperature so as not to release the drawer 36, pivot carriage 136, or carriage 240 until the sensor indicates a temperature below the maximum allowable.

By fully enclosing foodstuffs to be toasted, the toaster 10, 110, 210 of the present invention improves upon some of the deficiencies of existing toasters. In particular, the toaster 10, 110, 210 toasts thirty percent (30%) faster than an open-slot toaster. Also, the toaster 10, 110, 210 performs high quality toasting, in which the caramelized layer is fifty percent (50%) thinner than an open-slot toaster. The toaster 10, 110, 210 also produces more consistent toasting top to bottom. Additionally, by fully enclosing the foodstuffs, the toaster 10, 110, 210 is able to keep foodstuffs warm after toasting, a capability that open-slot toasters lack. Lastly, the opening of the drawer 36, pivot carriage 136, or door 230 of the toaster 10, 110, 210 allows for easy extraction of foodstuffs, especially small foodstuffs.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A toaster for heating foodstuffs, the toaster comprising:
   a chassis defining a cavity within an interior thereof, the chassis having at least one chassis opening extending between a front and a top of the chassis to allow access to the cavity from outside of the chassis;
   a door pivotably engaged with the chassis, the door being generally in the form of an inverted L in cross-section and having at least an open position and a closed position, such that, when in the closed position, the door substantially covers the chassis opening, and, when in the open position, the cavity is accessible through the chassis opening;
   a carriage fixedly engaged with the door, the carriage having a first position disposed completely within the cavity when the door is in the closed position and a second position extending at least partially from the cavity through the chassis opening when the door is in the open position;
   at least one slot disposed on the carriage, the slot being of a sufficient size and shape to accommodate a foodstuff to be heated, wherein, when the door is in the open position, the at least one slot is at least partially exposed, thereby allowing foodstuff to be loaded into the at least one slot; and
   at least one heating element engaged with the chassis and positioned within the cavity to be proximate the at least one slot when the carriage is in the first position;
   wherein the toaster has a heating configuration in which the carriage is in the first position and the door is in the closed position to confine the foodstuff being heated and create a generally enclosed chamber within the cavity in which heat and moisture loss is controlled.

2. The toaster of claim 1, further comprising a housing engaged with and at least partially surrounding the chassis, the housing having at least one housing opening corresponding to the chassis opening.

3. The toaster of claim 2, wherein the housing is insulated from the chassis, such that the housing remains cooler than the chassis when heating foodstuffs within the chamber.

4. The toaster of claim 3, wherein the housing has vents therethrough to facilitate dissipation of heat from within the toaster to further aid in keeping the housing cooler than the chassis when heating foodstuffs within the chamber.

5. The toaster of claim 2, further comprising a middle layer engaged with and at least partially surrounding the chassis and disposed between the chassis and the housing.

6. The toaster of claim 1, further comprising a seal disposed between the door and the chassis when the door is in the closed position to further control heat and moisture loss from within the chamber.

7. The toaster of claim 1, wherein the door is motorized for mechanized opening and closing thereof.

8. The toaster of claim 1, wherein the at least one slot includes generally parallel, spaced apart holding members extending between the carriage and the interior surface of the door.

9. The toaster of claim 8, wherein the holding members are movable toward one another in order to confine and generally center a foodstuff within the slot.

* * * * *